(12) United States Patent
Hogg et al.

(10) Patent No.: US 8,743,659 B1
(45) Date of Patent: Jun. 3, 2014

(54) SYSTEMS AND METHODS FOR COMMUNICATING IN A MULTI-DEVICE ENVIRONMENT

(71) Applicants: Tad Hogg, Mountain View, CA (US); Robert A. Freitas, Jr., Pilot Hill, CA (US); Daniel Reda, Santa Clara, CA (US)

(72) Inventors: Tad Hogg, Mountain View, CA (US); Robert A. Freitas, Jr., Pilot Hill, CA (US); Daniel Reda, Santa Clara, CA (US)

(*) Notice: Subject to any disclaimer, the term of this patent is extended or adjusted under 35 U.S.C. 154(b) by 0 days.

(21) Appl. No.: 13/871,908

(22) Filed: Apr. 26, 2013

Related U.S. Application Data

(62) Division of application No. 13/656,126, filed on Oct. 19, 2012.

(51) Int. Cl.
*H04B 1/02* (2006.01)
*G01S 3/80* (2006.01)
*G01S 1/72* (2006.01)

(52) U.S. Cl.
CPC .................................. *G01S 1/72* (2013.01)
USPC .......................................... 367/137; 367/138

(58) Field of Classification Search
USPC ................................................... 367/137
See application file for complete search history.

(56) References Cited

U.S. PATENT DOCUMENTS

| | | | |
|---|---|---|---|
| 7,570,998 B2 | 8/2009 | Zhang et al. | |
| 7,945,064 B2 | 5/2011 | O'Brien, Jr. et al. | |
| 8,040,020 B2 | 10/2011 | Martin et al. | |
| 8,088,067 B2 | 1/2012 | Vortman et al. | |
| 2004/0122323 A1* | 6/2004 | Vortman et al. | 600/459 |
| 2004/0202339 A1* | 10/2004 | O'Brien et al. | 381/312 |
| 2007/0281657 A1* | 12/2007 | Brommer et al. | 455/334 |
| 2008/0021289 A1* | 1/2008 | Zhang et al. | 600/300 |
| 2008/0276625 A1* | 11/2008 | Bretagne et al. | 62/6 |
| 2011/0198970 A1* | 8/2011 | Martin et al. | 310/340 |
| 2011/0273965 A1* | 11/2011 | Mayer et al. | 367/137 |
| 2012/0051187 A1* | 3/2012 | Paulson | 367/135 |
| 2012/0127833 A1* | 5/2012 | Ghen et al. | 367/137 |
| 2012/0172721 A1* | 7/2012 | Curra et al. | 600/439 |

OTHER PUBLICATIONS

A. Cavalcanti, B. Shirinzadeh, R. Freitas Jr., and T. Hogg "Nanorobot Architecture for medical target identification" Nanotechnology, vol. 19, (2008). 15 pages.*
Hogg, T., "Coordinating microscopic robots in viscous fluids". Auton Agent Multi-Agent Syst (2007) 14:271-305.*
Hogg, T. and Freitas, R.; "Acoustic communication for medical nanorobots." (2012) Nano Communication Networks.
Tse, D. and Viswanath, P.; Fundamentals of wireless communication. Cambridge, UK ; New York, Cambridge University Press; (2005).
Freitas, R.; Nanomedicine, vol. I: Basic Capabilities, Chapter 7(1999) Landes Bioscience.

* cited by examiner

*Primary Examiner* — Isam Alsomiri
*Assistant Examiner* — James Hulka
(74) *Attorney, Agent, or Firm* — Benedict O'Mahoney

(57) ABSTRACT

The invention provides devices and methods for using acoustics to communicate between a macro-scale transceiver and a micro-device or between multiple micro-devices. The micro-devices may passively scatter sound from a transceiver or actively generate sound. Acoustic waves can also provide power to a micro-device.

5 Claims, 5 Drawing Sheets

SYSTEMS AND METHODS FOR COMMUNICATING IN A MULTI-DEVICE ENVIRONMENT

CROSS-REFERENCE TO RELATED APPLICATIONS

This application is a Divisional Application of co-pending and commonly owned patent application Ser. No. 13/656,126, entitled "Acoustics for Power and Communication in Small Devices" by Freitas et al., with a filing date of Oct. 19, 2012, and is incorporated herein in its entirety.

FEDERALLY SPONSORED RESEARCH

Not applicable.

SEQUENCE LISTING OR PROGRAM

Not applicable.

FIELD OF INVENTION

The present invention relates to acoustics and, in particular, to a devices and methods for using acoustics to communicate between macro-scale devices and micro-scale devices.

BACKGROUND OF THE INVENTION

Micro-devices, or micro-machines, as discussed herein, are devices, often mechanical, electrical, or both, in nature, less than 200 microns in size. Structures and devices of this size and smaller can be built in many ways, such as using MEMS (micro-electro mechanical systems) techniques, which often employs lithography to create microscopic structures (and thereby overlap with integrated circuit manufacture techniques), self-assembly, micro-machining, or any other suitable technique. Note that while an entire micro-device may be up to 200 microns in size, its individual parts may be much smaller. For example, the state of the art in integrated circuit lithography allows features of 22 nm or smaller, self-assembly allows the creation of structures based on individual molecules, and AFM-based technologies allow the placement individual atoms. The methods of construction of micro-devices are numerous, and known to those skilled in the art.

Micro-devices have many potential applications. For example, in the medical field implanted micro-devices could provide high-resolution, real-time measures of many properties. Important solutes could be measured (e.g., glucose, sodium, potassium, calcium, bicarbonate, etc.), as could physical properties such as temperature and pressure. Current examples of macro-scale devices directed at performing similar functions include pill-sized cameras to view the digestive tract as well as implanted glucose and bone growth monitors to aid treatment of diabetes and joint replacements, respectively. The development of micro-devices significantly extends the capabilities of such machines. For example, clinical magnetic resonance imaging (MRI) can move micromachines containing ferromagnetic particles through blood vessels. (Ishiyama, Sendoh et al. 2002; Martel, Mathieu et al. 2007; Olamaei, Cheriet et al. 2010)

Other demonstrated micromachines use flagellar motors to move through fluids, and offer the possibility of minimally invasive microsurgeries in parts of the body beyond the reach of existing catheter technology. (Behkam and Sitti 2007; Fernandes and Gracias 10, 2009). The uses for such devices are numerous and extend beyond the field of medicine to uses such as basic research and industrial applications. Note that while exemplary uses are described herein, others will be apparent to those skilled in the art. It should be recognized that the value in the present invention resides in the general principles provided for powering and communicating with micro-devices of many different types, in many different environments, not just those mentioned or shown in the embodiments.

Providing power to the micro-devices is a challenge. For example, power from batteries would be limited by their small size and power harvested from the environment is limited by available energy sources and the complexity of manufacturing power generating components at small sizes. Other techniques, such as inductive powering and other forms of wireless power transmission can be hampered by the frequencies needed to efficiently couple to the micro-device and by attenuation in tissue.

Communication poses a challenge for micro-devices. Small overall device size limits antenna size, which makes selection of wavelengths which can be adequately coupled to a micro receiver or transmitter problematic. Further, the optimal modes of communication of a micro-device with a macro-scale transceiver may differ from the optimal modes of communication between micro-devices. Communication between micro-devices can address several problems. For example, such communications could enable machines to coordinate their activities, thereby providing a wider range of capabilities than having each machine act independently of others. For instance, nearby machines could compare their measurements to improve accuracy by averaging noise, determine gradients or identify anomalous behaviors such as the failure of one machine. Such communication could also allow the machines to combine their measurements into compressed summaries, thereby reducing the amount of information necessary to communicate to the external receiver. And, communication between micro-machines enables data to be sent to the micro-machine closest to the external receiver, thereby improving the transfer of information to the receiver.

The small size of the micro-devices is not the only challenge to providing power and communication. Micro-machines may operate within environments which raise additional challenges. For example, in the body, tissues, including blood, different organ tissues, and bone, may have physical properties that are not well-characterized at the small sizes relevant to micro-machines and such properties can vary over millimeter distances. The tissue properties may affect transceiver and micro-machine design and performance due, for example, to its attenuation characteristics.

Acoustics are one approach to coupling power and data transmission to micro-devices. Sound is readily transmitted through many materials and is easily produced by machines. Ultrasound has been used to communicate with conventional, large-scale implants, and micro-devices can use piezoelectric materials to produce sound. However, the small size of micro-machines makes them inefficient at converting vibration into sound waves at the frequencies commonly used for larger devices. Micro-devices are more efficient at generating higher frequency sounds. However, some environments (for example, biological tissue) significantly attenuate high-frequency sound. Compensating for inefficiency or attenuation would require significant power, which may not be available to the devices. And, in biological settings, even if sufficient power were available, increased power could lead to localized tissue damage due to intense power flux at the surface of the machines. Overcoming these problems requires creating a sound field adapted for transmission through various environments such as water or other fluids, blood, tissue, industrial chemicals or waste, or other environments, through suitable choices of operating frequencies, surface motions and calibration. This procedure requires different choices for sending sound from the micro-machines to each other, from a micro-machine to the external receiver and from the external transducer to the micro-device.

Acoustics, in the form of ultrasound, has been used for imaging, cleaning and agitation, industrial and biological measurement and testing, the enhancement of drug delivery (U.S. Pat. No. 7,985,184, 2011) as an adjunct to antibiotic therapy (and other uses related to cell permeability), for welding, for USID (ultrasound identification), and more. Micro-devices capable of generating ultrasound have the potential to provide similar functions, if the attendant problems with small device size can be overcome.

(U.S. Pat. No. 7,570,998, 2009) "Acoustic communication transducer in implantable medical device header," teaches an implantable medical device containing an ultrasonic transducer. Communication between the device and an implanted sensor occurs using frequencies in the 10-100 kHz range. These frequencies are suitable for conventional devices, but not micro-scale devices.

(U.S. Pat. No. 7,945,064, 2011) "Intrabody communication with ultrasound," teaches the use acoustics as an alternative to RF transmission. This describes macro-scale ultrasonic transducers using part of body as a communication channel at frequencies between 100 kHz and 10 MHz. This does not teach the use of micro-devices, and the frequencies are generally too low to efficiently couple to micro-devices.

(U.S. Pat. No. 8,040,020, 2011) "Encapsulated active transducer and method of fabricating the same" teaches MEMS-based ultrasound generators. Specific applications (e.g., communication within tissue) are not discussed.

(U.S. Pat. No. 8,088,067, 2012) "Tissue aberration corrections in ultrasound therapy," teaches adjusting ultrasound for tissue inhomogeneities at larger scales for improved focus. The size scales, and attendant challenges, are quite different than the present invention.

Theoretical studies of communication with and among sub-millimeter implanted devices, have been published ((Freitas 1999; Hogg and Freitas 2012), by the inventors and upon which this application is based and which is herein incorporated by reference). However, these studies do not address all of the challenges or details involved in micro-scale communication and power.

While some differences between the invention and the prior art a listed above, a more general observation should be made: The prior art is not directed to surmounting the problems inherent in transceiving sound at small scales and distances.

Specifically, the prior art does not address one or more of the following problems: limitations in available power, power coupling to micro-devices, acoustic attenuation in various milieus (e.g., tissue), efficient acoustic wave generation by micro-devices, thermal noise and its effect on communication rates, safety (in biological settings) or the choice of frequencies based upon communication channel spacing and background noise.

SUMMARY OF THE INVENTION

The invention provides devices and methods for using acoustics to communicate between a macro-scale transceiver and a micro-device or between multiple micro-devices. The micro-devices may passively scatter sound from a transceiver or actively generate sound. Acoustic waves can also provide power to a micro-device.

The invention overcomes many of the disadvantages to the prior art with respect to the powering of micro-devices, and communication with micro-devices, by teaching the design of acoustic fields capable of providing power and data transfer and which are suited to the physical properties specific to small devices and their environment.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
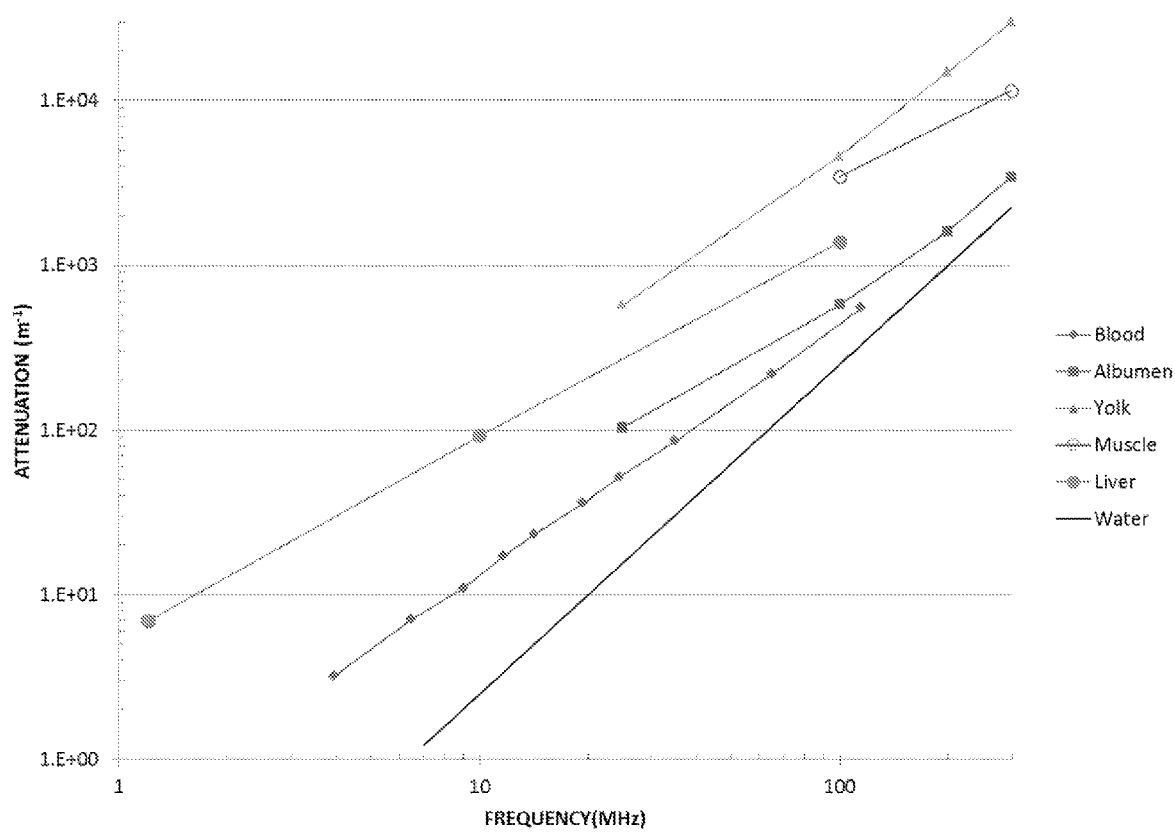
FIG. 1 is a graph illustrating the attenuation coefficients of various materials as a function of frequency.

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

In describing the invention and exemplary embodiments, below we describe the acoustic power calculations, the acoustic properties of representative environments (e.g., biological tissue), and how the interplay of power and the acoustic properties of both micro-devices and their environment lead to novel conclusions concerning the choice of frequencies and the design of sounds fields for micro-scale devices.

DEFINITIONS

"Acoustics," "acoustic waves," or "sound" means time-varying pressure waves of any frequency.

"Fluid" includes fluid or gas phase material.

"Micro-device" means any device between about 10 nm and about 200 microns in size. A micro-device may also be referred to as a micro-machine, or simply as a device or machine where the meaning is clear.

"Scattering" is the effect caused by acoustic waves reflecting from or passing through regions with different acoustic properties (including micro-devices). Scattering includes lack of scattering or absorption. Scattering includes the near and far field, and resonant and non-resonant scattering.

Sounds Waves and Power

Acoustics consists of pressure variations in a fluid or solid medium. These variations satisfy the wave equation. We focus on the frequency response by taking the time dependence of acoustic quantities to oscillate with frequency f. The corresponding wavelength is $\lambda=c/f$, where c is the speed of sound. The behavior of sound waves depends on both the amplitude and phase of the waves, which are conveniently represented in combination as complex numbers. Specifically, we take the pressure, p, at location x and time t to be $\Re(Fe^{-i\omega t})$ where $\omega=2\pi f$. Using this choice of time dependence, the wave equation reduces to the Helmholtz equation:

$$\nabla^2 p(x) + gk^2 p(x) = 0$$

where $\nabla^2$ is the Laplacian differential operator and k is the complex-valued wave vector:

$$k = \omega/c + i\alpha$$

with $\alpha$ characterizing the attenuation of sound waves in the medium. For fluids, the attenuation is related to the dynamic and bulk viscosities, $\eta$ and $\xi$, respectively, by:

$$\alpha = (4\eta/3 + \xi)(\omega^2/(2c^3\rho))$$

where $\rho$ is density. The corresponding velocity amplitude at location x is:

$$v(x) = -(i\omega/(c^2k^2\rho))\nabla p(x)$$

The first wave equation above describes how sound propagates in a given media. In the case of sound being generated by a micro-device, for purposes of clarity we do not include in our calculations the internal construction of the micro-device, but instead use boundary conditions specifying the velocity on the micro-device surface. Our modeling assumptions for micro-devices also include that the amplitude of the generated sound approaches zero at large distances and that if only a part of a micro-device surface is actuated to produce oscillations, the remainder of the micro-device surface does not move. These are not fundamental limitations, but rather reasonable simplifications that allow us to more clearly explain the key concepts involved.

A micro-device must apply power to move its surface against the fluid. Due to the small device sizes, we focus on Newtonian viscous effects as the most relevant, rather than non-Newtonian fluids or viscoelastic materials. In a viscous fluid, pressure and viscosity produce forces acting on the device surface. The $i^{th}$ component of the force the fluid exerts on a surface element dA oriented in direction n-hat is $-dA\Sigma_j T_{i,j} n\text{-hat}_j$ where the stress tensor component $T_{i,j}$ is the flux of the $i^{th}$ component of momentum density across a surface oriented with normal in direction j. For viscous fluids, the stress associated with small amplitude sound waves calculated by the fluid stress equation is:

$$T_{i,j} = p\delta_{i,j} - \eta\left(\frac{\partial v_i}{\partial x_j} + \frac{\partial v_j}{x}\right) - \left(\xi - \frac{2}{3}\eta\right)\delta_{i,j}\nabla \cdot v$$

where $\delta_{i,j}=1$ if i=j and is zero otherwise. The force the micro-device must exert on the fluid to maintain the oscillation at its surface is the negative of the force from the fluid on the device, namely:

$$F = \int_S T \cdot \hat{n} \, dA$$

where the integral is over the oscillating surface S of the device. When pressure and velocity used to compute the stress in the fluid stress equation above are expressed in terms of the complex-valued amplitudes, the time-dependent force is $\Re(Fe^{-i\omega t})$ and the power applied by the device on the fluid is:

$$P(t) = \Re(Fe^{-i\omega t}) \cdot \Re(ve^{-i\omega t})$$

where v is the velocity amplitude on the surface, assuming the same oscillation everywhere on the surface. This expression gives the time-dependent power for the case of uniform velocity of the device surface. In general, the device could have different oscillation amplitudes, both in magnitude and phase, at different parts of the surface, in which case the power would be the integral of stress times velocity over the surface.

The power requirement can change sign during the oscillation period. That is, for some portion of the oscillation, the device does work on the fluid while at other times the fluid does work on the device. Provided the device structure is elastic rather than dissipative, the device could recover this power for subsequent use. Of more significance for quantifying communication power requirements is the time-averaged power, which in terms of the amplitudes is:

$$P = \frac{1}{2}\Re(F \cdot v^*)$$

where $v^*$ is the complex conjugate of v.

The radiated acoustic power arises from the pressure oscillations, with time-averaged power flux across a surface element dAn-hat given by:

$$P_{radiated\ flux} = \frac{1}{2}\Re(pv^* \cdot \hat{n})$$

Integrating this flux over the surface gives the total power radiated through that surface. The previous two equations may be used to compute power dissipation by, and the acoustic radiated power of, the device.

Acoustic Properties of Specific Environments

Transducers have near field and far field regions. Within the near field, non-parallel wave fronts may create areas of constructive and destructive interference, resulting in a complex distribution of flux that can change substantially over short distances. In many applications of acoustics (e.g., medical ultrasound), near field reflections may be considered problematic noise. This is commonly called "near field clutter." However, with respect to the present invention, due to the small sizes and distances that may be involved, near field effects must be accounted for, and in fact can be used to advantage. For example, if one calculates the near field variations proximate to a macroscopic transmitter which is transmitting to one or more micro-devices, it could be possible to position the transmitter so that the micro-devices are in areas of high, or low, acoustic flux, as desired. This has applications including selective communication when multiple micro-devices are present or increased power transmittal to a micro-device. For example, due to device or safety limitations, it could be the case that the average power output from a transducer may not be increased, but regions of higher acoustic power in the near field may allow one to direct that part of the field to specific micro-devices.

The properties of a micro-device's environment substantially affect the choice of acoustic power coupling frequencies and communication frequencies (and the two may not be the same). Herein we consider the acoustic properties of various materials, including biological tissue, which is especially relevant to medical applications.

TABLE 1

| General Environment Assumptions | |
|---|---|
| Parameter | Value |
| speed of sound | c = 1500 m/s |
| density | ρ = 1000 kg/m³ |
| ambient temperature | $T_{body}$ = 310K |
| thermal conductivity | $k_{thermal}$ = 0.6 W/m/K |
| heat capacity | $c_{thermal}$ = 4200 J/kg/K |

Different materials vary in acoustic properties, including speed of sound and density. For speed of sound and density we use values corresponding to water at body temperature ($T_{body}$) as an adequate approximation for exemplary purposes. The values in Table 1 make reasonable approximations about environment parameters such as the speed of sound and density, for aqueous solutions. These values are not intended to cover all applications, but rather demonstrate one set of parameters that we can use to perform the necessary calculations. Note that we are specifically considering the environment external to a micro-device with these parameters, not the micro-device itself, which may be composed of a substance with very different parameters, such as silicon or gallium arsenide.

Boundaries between different types of tissue can scatter acoustic waves. However, for distances of less than about 100 microns we consider a single type of tissue to have homogeneous characteristics. It is reasonable to ignore reflections from tissue boundaries at this scale because the amplitude of the reflection depends on the difference in acoustic impedance on either side of the boundary, which is small because impedances for most tissues cluster between 1.4-1.8×10⁶ kg/m²s. Scattering due to tissue inhomogeneities is also small because the wavelength is much larger than the typical 10-500 nm size of intracellular organelles and other potential scattering foci. In the case of an external transceiver, we can create an approximately homogenous environment using, e.g., impedance matching gel.

Even assuming a constant temperature and density, and assuming a lack of scattering, the attenuation for various materials varies a great deal both between the different materials and between the same material at different wavelengths. FIG. 1 shows the attenuation coefficients of several different environments which could be relevant to micro-device function. Note that FIG. 1 is a log-log plot, and so small differences in the lines actually represent large difference in attenuation. The attenuation values span such a large range that representing them on a linear plot is cumbersome. In addition to the attenuation values varying greatly between materials (some tissues vary by over a factor of 40 with respect to water), attenuation values also vary greatly within the same materials as frequency changes. This leads to unintuitive conclusions about the optimal frequencies for power and communication purposes, as will be discussed herein.

Attenuation distance is defined as $1/\alpha(f)$ where the attenuation function, $\alpha(f)$, is a function that varies between materials and must generally be determined empirically. The following data illustrates how the attenuation coefficient affects sound attenuation at various distances and frequencies:

| Frequency | 10 Mhz | 100 Mhz | 300 Mhz |
|---|---|---|---|
| Wavelength | 150 μm | 15 μm | 5 μm |
| | | Attenuation Distance | |
| Water | 400,000 μm | 4,000 μm | 440 μm |
| Liver | 11,000 μm | 720 μm | 200 μm (extrapolated) |

Micro-Device Geometry, Sound Pressure, and Power

While micro-devices could take a variety of shapes, modeling such devices as a sphere facilitates analysis of the general case. In the following example we assume a pulsating sphere whose radius changes as $\alpha+\alpha\epsilon \cos(\omega t)$ with $\epsilon\ll 1$. Due to the spherical symmetry of this geometry, the acoustic pressure and velocity depend only on the distance from the sphere, and velocity is directed radially. Thus acoustic radiation is the same in all directions and the Helmholtz equation becomes:

$$\frac{d^2 p}{dr^2} + \frac{2}{r}\frac{dp}{dr} + k^2 p = 0$$

The solution matching the motion of the sphere at r=a and decreasing to zero as r goes to infinity is:

$$p(r) = \frac{a^3 c^2 k^2 p\varepsilon}{r(-1+iak)} e^{-ik(a-r)}$$

The corresponding velocity is:

$$v(r) = -\frac{ia^3 \omega\varepsilon(kr+i)}{r(-1+iak)} e^{-ik(a-r)}$$

The velocity at the surface of the sphere is $v(\alpha)=-i\alpha\omega\epsilon$. Thus the time-dependent velocity $\Re(v(\alpha)e^{-i\omega t})=-\alpha\omega\epsilon \sin \omega t$ corresponds to the motion of the sphere discussed above.

The wave vector k has the positive imaginary part so that the last factor in these expressions:

$$e^{-ik(a-r)}=e^{-\alpha(r-a)}e^{iw(r-a)/c}$$

decreases exponentially as $r\to\infty$.

Where discussing communication between directly between micro-devices, the attenuation distances will often be large compared to the robot sizes and distances between robots we consider. Consequently, we consider the exponential attenuation factor $e^{-\alpha(r-a)} \approx 1$ for these distances. That is, the attenuation factor is a relatively minor contribution to acoustic power loss. Over these distances, pressure decreases as $1/r$. The velocity behavior depends on the frequency. If ka is small (low frequency or a small sphere) then v(r) decreases rapidly, as $1/r^2$ near the sphere, up to distances where kr≈1, beyond which the velocity decreases more slowly, as $1/r$.

At high frequencies or for larger spheres, when ka is comparable or larger than one, the velocity decreases at the slower rate $1/r$ over this full range of distance. Thus the value pv*, which determines the radiated power, decreases as $1/r^3$ for low frequencies and near the sphere or as $1/r^2$ otherwise (e.g., in the case of the longer distances that may be considered when using a macroscopic transceiver). The relative phases of p and v also affect the time-average radiated power. When ka<<1, (i.e., a small sphere or using low frequencies) radiation of acoustic power is less efficient. In tissue, this effect is compounded by the higher tissue viscosity at low frequencies. All of the foregoing affects should be taken into account when determining the communication or power frequencies most suitable for a given situation.

Efficiency and Frequency

Due to the large differences in the attenuation properties of various materials and the large differences in attenuation within the same material at different frequencies, there is no single optimum frequency with respect to efficiency. Optimum frequencies are highly use and environment-specific, and high frequency parameters cannot be simply inferred from lower frequency information and vice versa.

Using the formulas described herein and commonly known, we consider the broadcast efficiency of three different spheres at a distance of 100 microns. Each sphere is modeled as generating sound by uniformly expanding and contracting, with the periodic change in radii generating time-varying pressure waves. The broadcast efficiency can be thought of as being the product of the acoustic efficiency (that is, the fraction of input power which results in acoustic waves at the sphere surface) and the transmission efficiency (that is, the fraction of acoustic energy produced by the sphere which reaches the target distance).

The spheres have radii of 0.5 um, 5 um, and 50 um, which we use as representative of a wide range of possible micro-devices. We consider each sphere in two different environments: water and liver. We plot the resulting efficiency curves in FIGS. 2 and 3. As will be seen from the figures, it is not sufficient to assume that all environments, even if primarily aqueous as are most biological tissues, behave like water. For example, as shown, the broadcast efficiency at a given frequency or size in liver can be very different from that in water.

Figure 2:
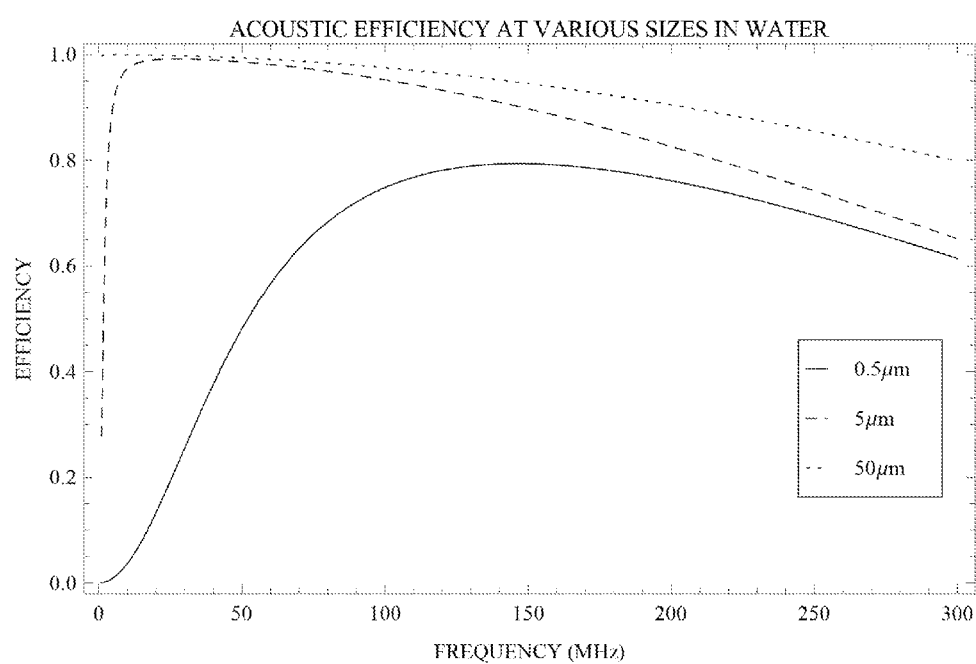
FIG. 2 is a graph illustrating the acoustic efficiency of micro-devices of various sizes in water.
Figure 3:
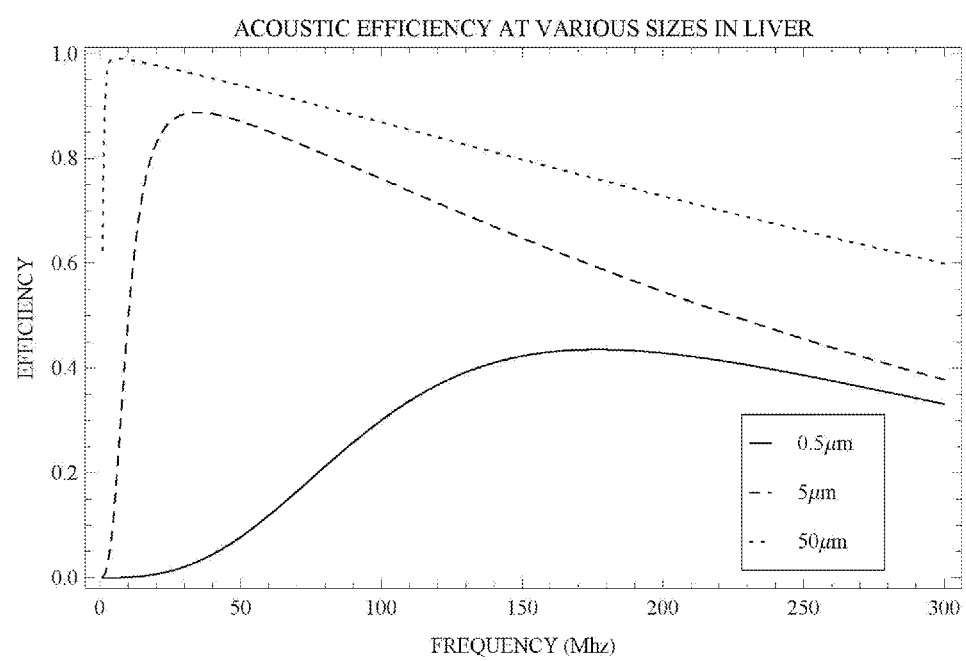
FIG. 3 is a graph illustrating the acoustic efficiency of micro-devices of various sizes in liver.

The three different sphere sizes, the 100 micron broadcast distance and the efficiency curves presented for water and liver are representative cases. It will be obvious to those skilled in the art that other materials, distances, and devices sizes will have their own broadcast efficiency curves which may differ from both water and liver. The data presented in FIGS. 2 and 3 is not intended to provide specific frequency choices for systems using other parameters, but rather to illustrate the principles upon which such choices may be made for any such system. The data is based upon empirically determined attenuation coefficients except that above 100 Mhz the liver data has been extrapolated.

The efficiency functions for the three different size spheres in water, and how to plot the data in Mathematica, is shown by the following code:

```
(* start code *)
efficiency05water[f_]:=(0.00038*f^2*((4.4*f^2)/10^6+
   1))/(E^((5.0*f^2)/10^6)*((1.7*f^4)/10^9+0.00039*f^2+
   1))  efficiency5water[f_]:=(0.38*f^2)/(E^((4.8*f^2)/
   10^6)*(0.39*f^2+1))  efficiency50water[f_]:=(1.0*f^2)/
   (E^((2.5*f^2)/10^6)*(f^2+0.0026))      Plot
   [{efficiency05water[f],        efficiency5water[f],
   efficiency50water[f]}, {f, 1, 300}]
(* end code *)
```

As can be seen in FIG. 2 and FIG. 3, the maximum broadcast efficiency in water occurs at frequencies of about 1-10 MHz, 25 MHz, and 150 MHz for spheres of 50 um, 5 um, and 0.05 um, respectively. In liver, the maximum broadcast efficiency occurs at about 5 MHz, 30 Mhz, and 180 MHz, for spheres of 50 um, 5 um, and 0.05 um, respectively.

The formulas, methods and data presented herein demonstrate that because acoustic efficiency increases with frequency, but transmission efficiency decreases with frequency, there is a frequency for a given material, sizes and distance, which is the optimal compromise. For example, as FIGS. 2 and 3 show, in some cases the most efficient frequency is under 30 Mhz, but in other cases, well over 100 Mhz.

The differences between the efficiency curves for water and liver, and for the different radii spheres even within the same material make it obvious that the methods described herein to determine efficient frequencies are necessary for optimal design, as no single frequency or simple rule of thumb suffices. In addition to the value in determining the most efficient single frequency for a given system, there is value to knowing the shape of the efficiency curve (that is, the values at frequencies other than the optimal frequency). This is because efficiency is not the only design criteria. Other factors such as equipment limitations, communications requirements or safety limits (e.g., limitation of power flux in biological settings) may suggest that compromises be made in operating at frequencies other than, or in addition to, the most efficient frequencies. In such cases it is helpful to know how far from optimal other frequencies may be so that the resulting power loss can be considered in the overall frequency choice.

Frequency Choice for Communication

Communication data rates may be important in considering operating frequencies. Since data rate increases with frequency, it may be useful to operate a device at a frequency higher than its optimal broadcast efficiency frequency. This may particularly be the case when the loss of efficiency is small compared to the gain in data transfer rate. For example, a 5 micron robot has an efficiency of 0.97 at 30 MHz in a low-attenuation environment. That same robot would experience only a small decrease in efficiency at 100 Mhz, where efficiency would be 0.90. Therefore, the robot would experience only about a 7 percent decrease in efficiency, while the increase in frequency has increased the possible communication data rate by 333%. Other factors may also affect the choice of communication frequencies, including the use of single frequencies versus multiple frequencies ("spread spectrum" or "wideband communication"), the choice of encoding techniques, the level of acceptable error rates, power requirements, distance (including whether the devices are operating in the near or far field) and the presence of ambient noise at a given frequency.

Figure 4:
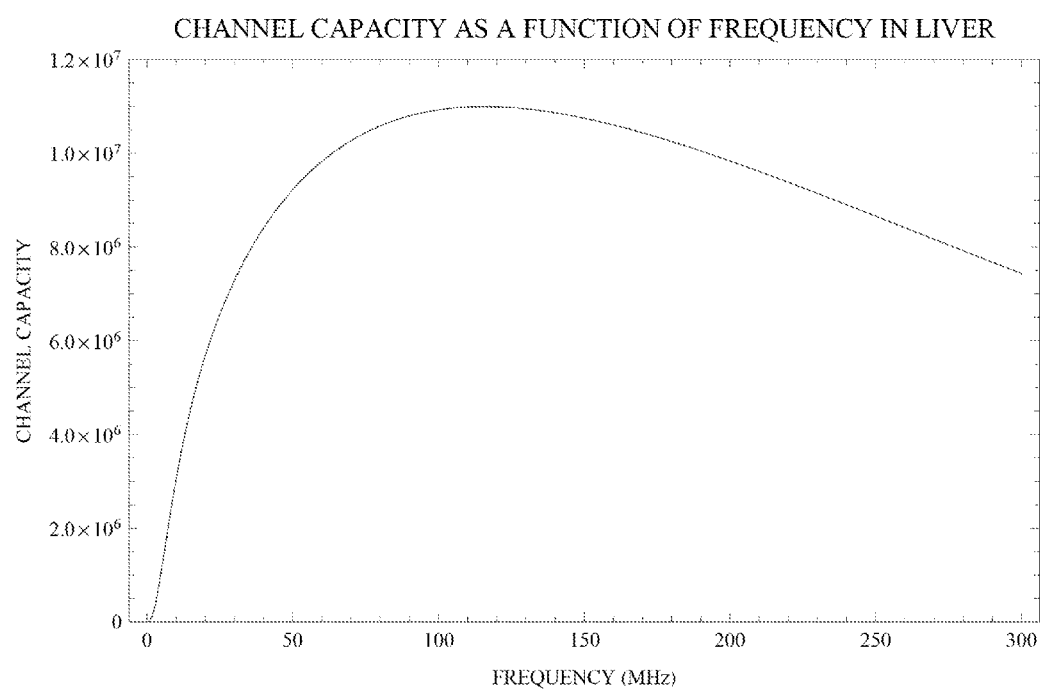
FIG. 4 is a graph illustrating channel capacity as a function of frequency for 5 um devices in liver.

These topics are discussed in detail in (Hogg and Freitas 2012), but we provide here an example based upon a 5 micron radius sphere in liver tissue, showing the communication curve for channel capacity across frequencies. The data in FIG. 4 assume communication between two micro-devices, each 5um in diameter, 100 um apart, using a single frequency, with the transmitting device using 100 pW power, in liver tissue, whose efficiency and attenuation characteristics have been describe herein. As can be seen from FIG. 4, when all the appropriate constraints are taken into account, an understanding of the choice of optimal frequencies emerges which differ from that which might be inferred by the efficiency characteristics of the environment alone, and certainly differ from that of water, which is used as the basis for similar calculations frequently in the prior art. In this particular case, although a 5 um sphere transmitting acoustic waves in an environment with the attenuation characteristics of liver has maximum broadcast efficiency at about 30 MHz, maximum channel capacity is obtained at about 120 MHz—4 fold higher. This is because, in this range, channel capacity increases with frequency faster than efficiency decreases. So, depending on whether power transmission is more important than channel capacity, or vice versa, or whether these (and other) constraints need to be balanced against each other, in this example the appropriate choice of frequency could be 30 MHz, 120 MHz, or somewhere in between. Note that multiple communication paths may exist. For example, in some cases calculations may dictate that a micro-device should attempt to communicate directly with its end target. In other cases, using an intermediate micro-device as a relay point may prove useful.

Figure 5:
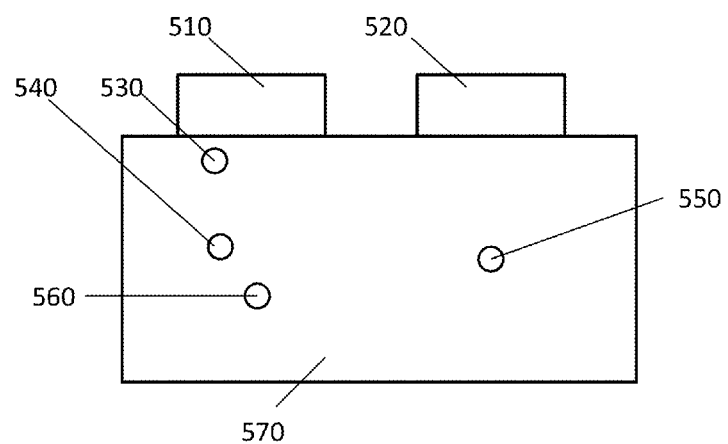
FIG. 5 is a block diagram illustrating possible communication and power arrangements between macroscopic transceivers and microscopic devices.

FIG. 5 illustrates some possible arrangements (not to scale) of macroscopic transducers and micro-devices. A first transducer 510 and second transducer 520 are present, but in reality any number could be used (or one or more transducers could be moved), to communicate with, and provide power to, micro-devices 530, 540, 550 and 560 in a given environment 570. In this particular scenario, micro-device 530 may be in the near field of transducer 510, while micro-devices 540, 550 and 560 may be in the far field of either transducer 510 or 520. Each micro-device may communicate with a transducer directly, or, for example, micro-device 560 could communicate with micro-device 540, which in turn might communicate with transducer 510 directly, or might use micro-device 530 as a relay. Micro-devices may also communicate with each other directly, such as micro-device 560 communicating with micro-device 540 without the involvement of either transducer. Either transducer 510 or 520 could provide power to one or more of the micro-devices, although all other things being equal, the closest transducer would tend to provide the most efficient power source.

An accurate understanding of the transmission characteristics of the environment at various distances and frequencies, the power available to each device, and the possible communication pathways, is necessary to make decisions regarding communication and power optimally.

Other exemplary embodiments herein have focused upon single-band transmission of data. These calculations can be adapted to broadband communication in light of the fact that channel capacity with thermal noise can be defined as:

$$\Delta f \log_2\left(1 + \frac{P}{kT\Delta f}\right)$$

which is monotonically increasing in the bandwidth $\Delta f$ when the received power P is independent of frequency. It gets close to its limiting value when $\Delta f \gg P/(kT)$. In our case, the ratio $P/(kT)$ is considerably higher than the operating frequencies considered, suggesting larger bandwidths would perform better than narrowband communication, such as the choice $\Delta f=0.1$ f. That is, instead of putting all the input power into a narrow band around the frequency giving the best transmission, wider distribution of frequencies can be better.

However, the received power P is frequency dependent: low frequencies have inefficient conversion of input power into acoustic waves and high frequencies have large attenuation. Thus instead of channel capacity increasing monotonically with increasing bandwidth, there is a limit to the useful bandwidth. For best performance, relatively more power should go in the more efficient frequencies rather than allocating power uniformly over the bandwidth. Additional information relevant to broadband frequency allocation in general (without considering micro-device constraints or environment parameters such as attenuation in various tissues) may be found in (Tse and Viswanath 2005).

It will be obvious to one skilled in the relevant arts that the calculations described herein can be implemented in many ways, including on a general purpose computer with appropriate software, on an application-specific integrated circuit (ASIC), or using a field-programmable gate array (FPGA). The calculations could be done ahead of time and then used to set device frequencies, or to determine device design parameters. Or, the calculations could be performed in real-time by either a computational means attached to a macroscopic transducer or in the micro-device itself. Real-time calculations would have the advantage of being able to use data from the immediate environment (e.g., the attenuation perceived by the transceiver or micro-device) to adjust the calculations accordingly, for example, modifying the frequency or frequencies being used on-the-fly or directing specific regions of the near field as desired.

Power coupling with acoustic waves exhibits size, distance, and environment-dependent phenomena. Traditional macroscopic devices that use acoustic waves may need substantial penetration (for example, medical ultrasound), have a large amount of power available to them, do not have to be designed so as to effectively couple power from or to micronscale surfaces, and typically operate in the far field. Micro-devices, on the other hand, may be very close together, may have very limited power available, and may operate in the far or near field. These differences necessitate different design paradigms where, for example, the attenuation coefficient of the environment can have a large impact of the choice of frequencies, efficiency is of great importance for power coupling, and determining the optimal data communication rates is multifactorial and so cannot be determined from treatments in the prior art which do not consider all relevant variables which, while understandably overlooked in designs aimed solely at macroscopic devices, should not be overlooked when micro-devices are involved.

The invention and representative embodiments described herein teach how to use acoustic waves for communication and power optimally (or at least with knowledge of the relevant trade-offs) in light of the environment and operating requirements, between micro-devices, or between a macroscopic transceiver and one or more micro-devices. The methods, formulas and data provided herein can be applied to most environments where the distances and device sizes are similar to those we describe.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method of acoustically communicating with an apparatus comprising:
   a) calculating a coupling efficiency with a micro-device, wherein the micro-device is between 10 nanometers and 200 microns in size in its smallest dimension, for each of a plurality of frequencies using relative power intensities created in different areas of a near field of acoustic waves;
   b) selecting one or more frequencies from the plurality of frequencies wherein the calculated coupling efficiency of each of the one or more frequencies provides for efficient communication with the micro-device; and
   c) communicating acoustically with the micro-device via the one or more frequencies.

2. A method of communicating with an optimal receiving micro-device in a multi-device environment comprising:
   a) comparing a rate of communication attainable between a transmitting micro-device and a plurality of receiving micro-devices, wherein the micro-device and each of the plurality of receiving micro-devices are between 10 nanometers and 200 microns in size in their smallest dimension;
   b) selecting an optimal receiving micro-device from the plurality of micro-devices wherein the optimal receiving micro-device has the optimal communication rate attainable; and
   c) communicating with the optimal receiving micro-device.

3. A method of signaling a transmitter by a micro-device comprising:
   a) modifying the micro-device's acoustic properties; and
   b) detecting the modified acoustic properties using scattered sound, wherein the micro-device is between 10 nanometers and 200 microns in its smallest dimension.

4. An apparatus for communicating with a micro-device comprising:
   a) means for calculating a coupling efficiency for each of a plurality of frequencies using relative power intensities created in different areas of a near field of acoustic waves;
   b) means for selecting one or more frequencies from the plurality of frequencies wherein the calculated coupling efficiency of each of the one or more frequencies provides for efficient communication with the micro-device, wherein the micro-device is between 10 nanometers and 200 microns in its smallest dimension; and
   c) means for communicating acoustically with the micro-device via the one or more frequencies.

5. An apparatus for signaling a transmitter by a micro-device comprising:
   a) the micro-device wherein the micro-device is between 10 nanometers and 200 microns in size;
   b) means for modifying the micro-device's acoustic properties; and
   c) means for detecting the modified acoustic properties using scattered sound.

* * * * *